Nov. 18, 1969   J. R. BAUMGARTNER ET AL   3,478,556
FORGING APPARATUS
Original Filed Jan. 15, 1962   8 Sheets-Sheet 7
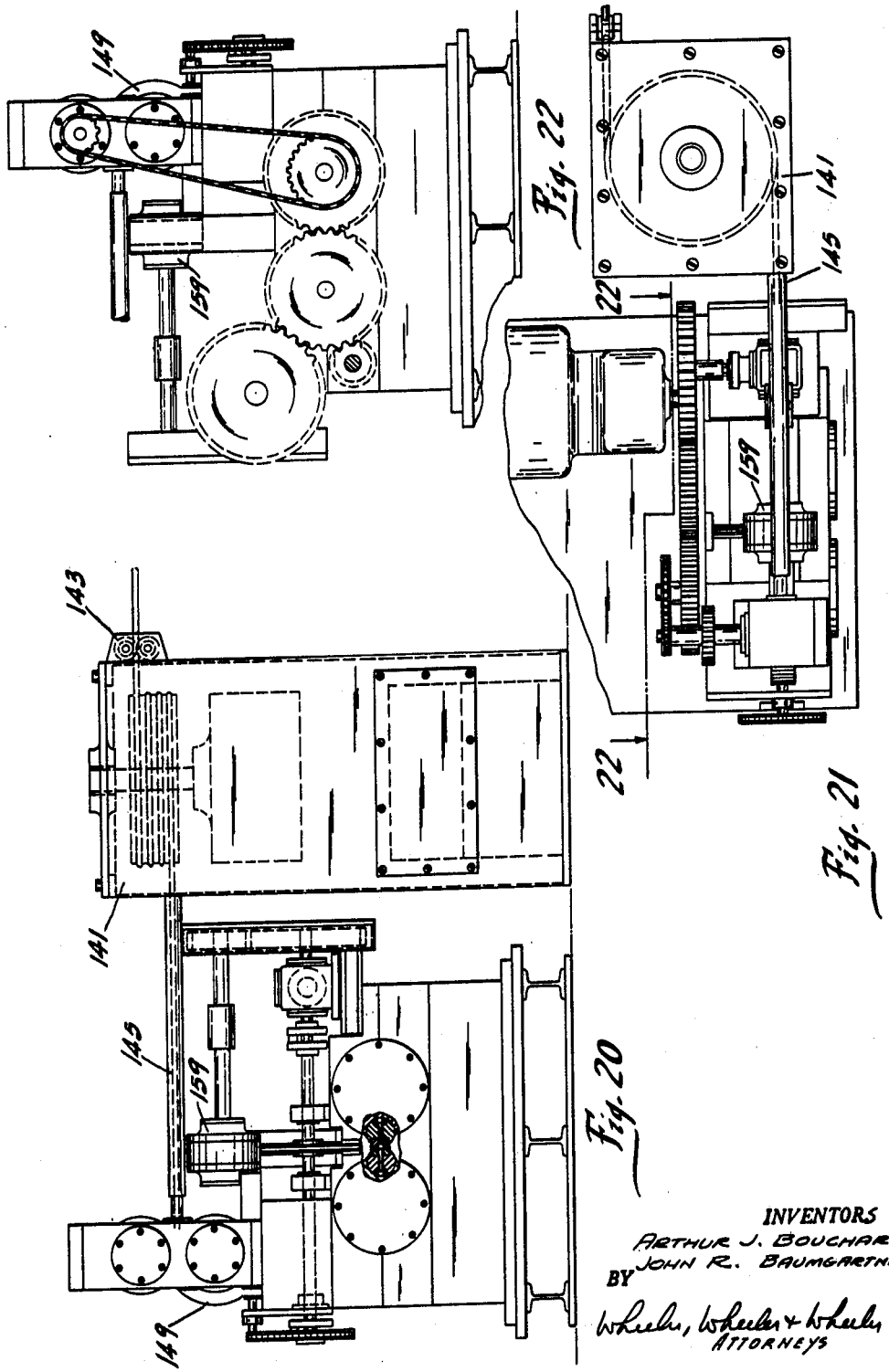
INVENTORS
ARTHUR J. BOUCHARD
JOHN R. BAUMGARTNER
BY
Wheeler, Wheeler + Wheeler
ATTORNEYS

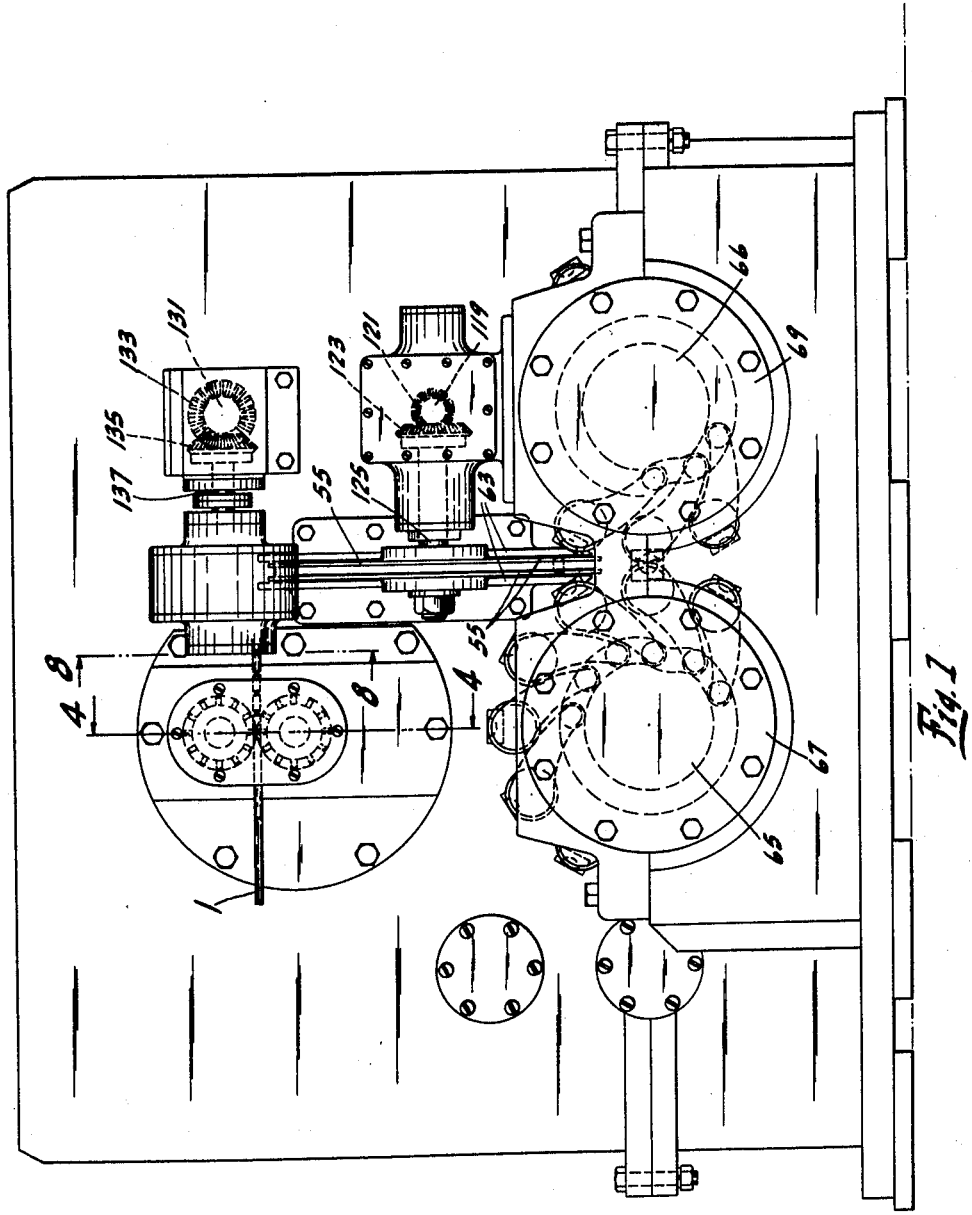

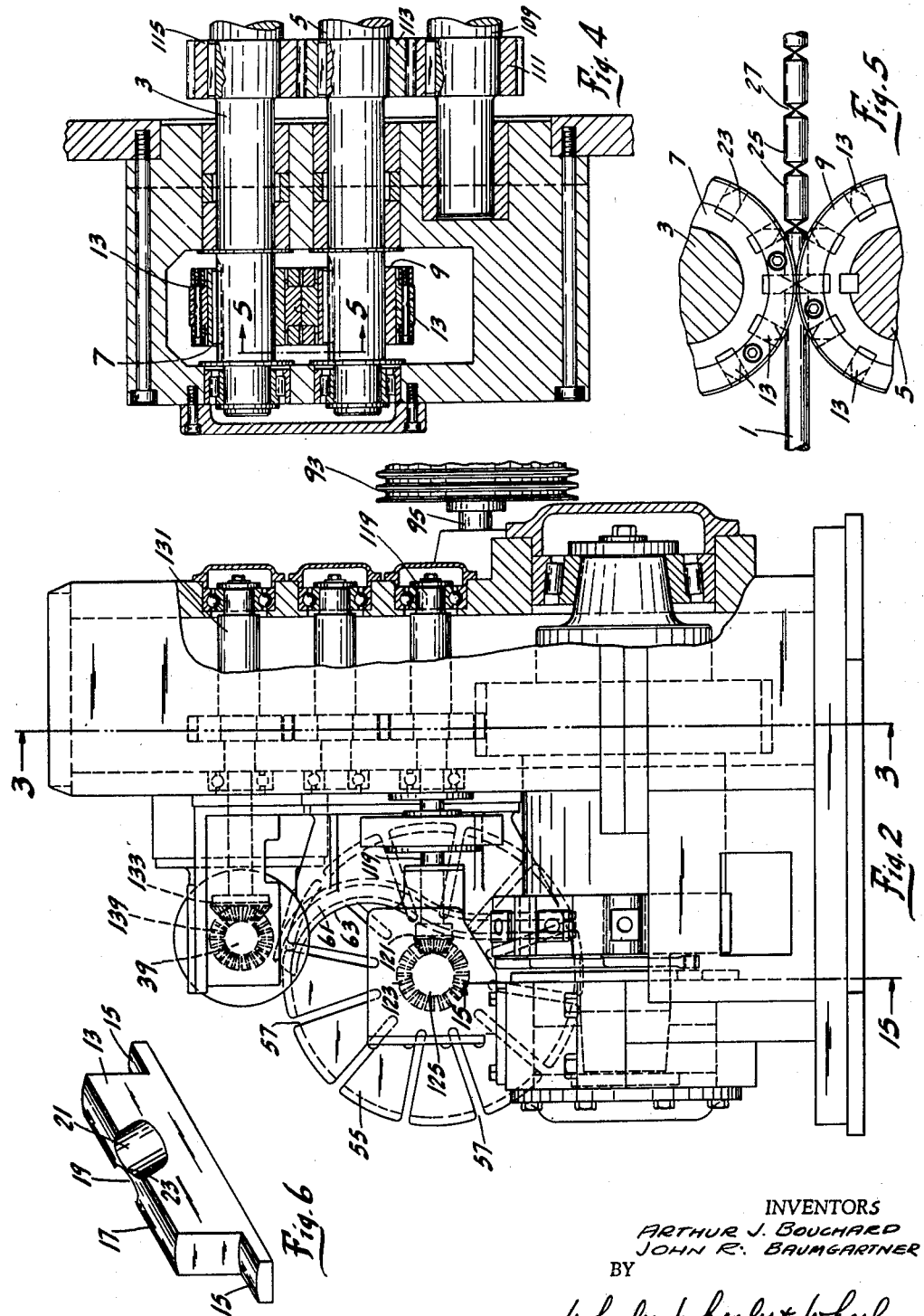

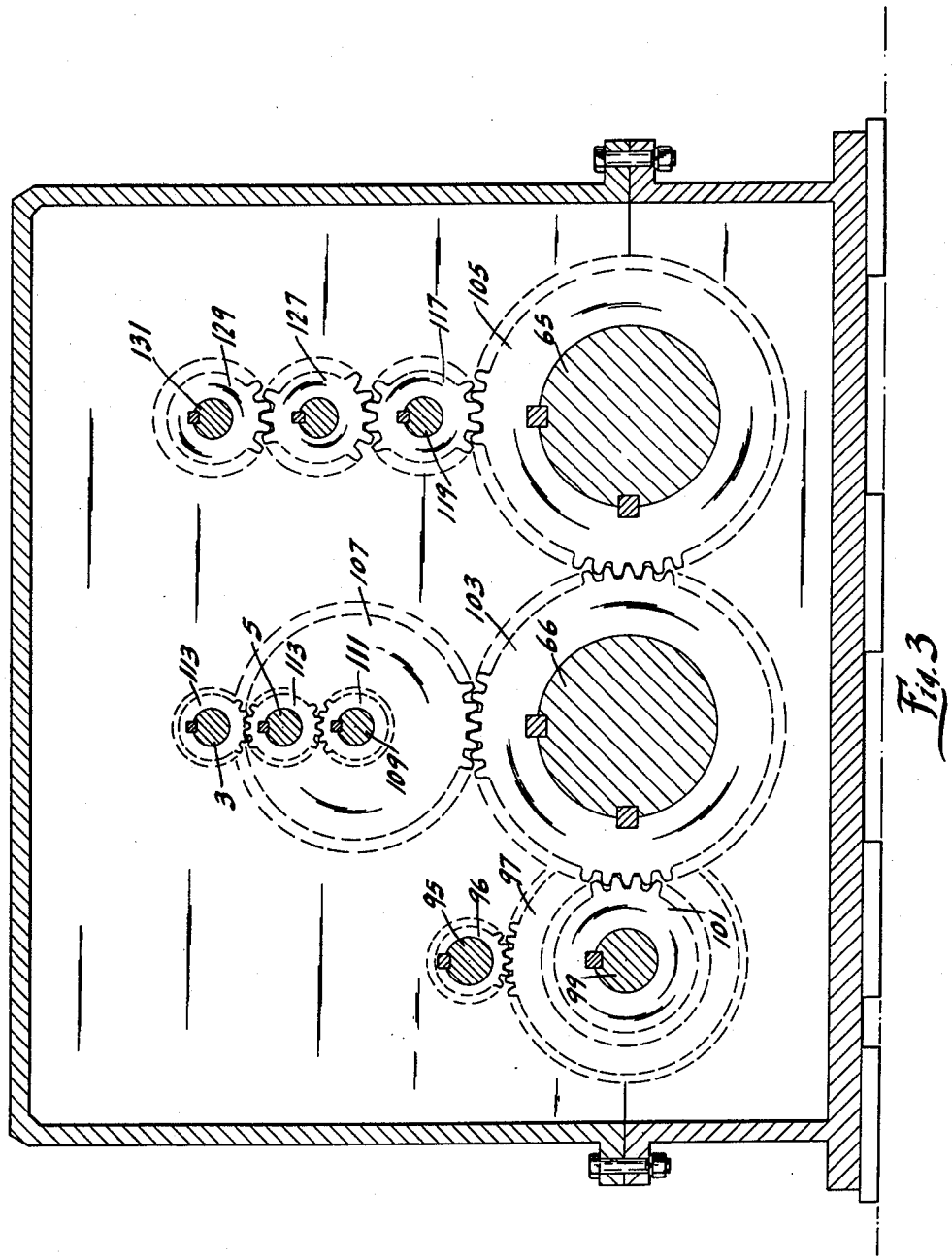

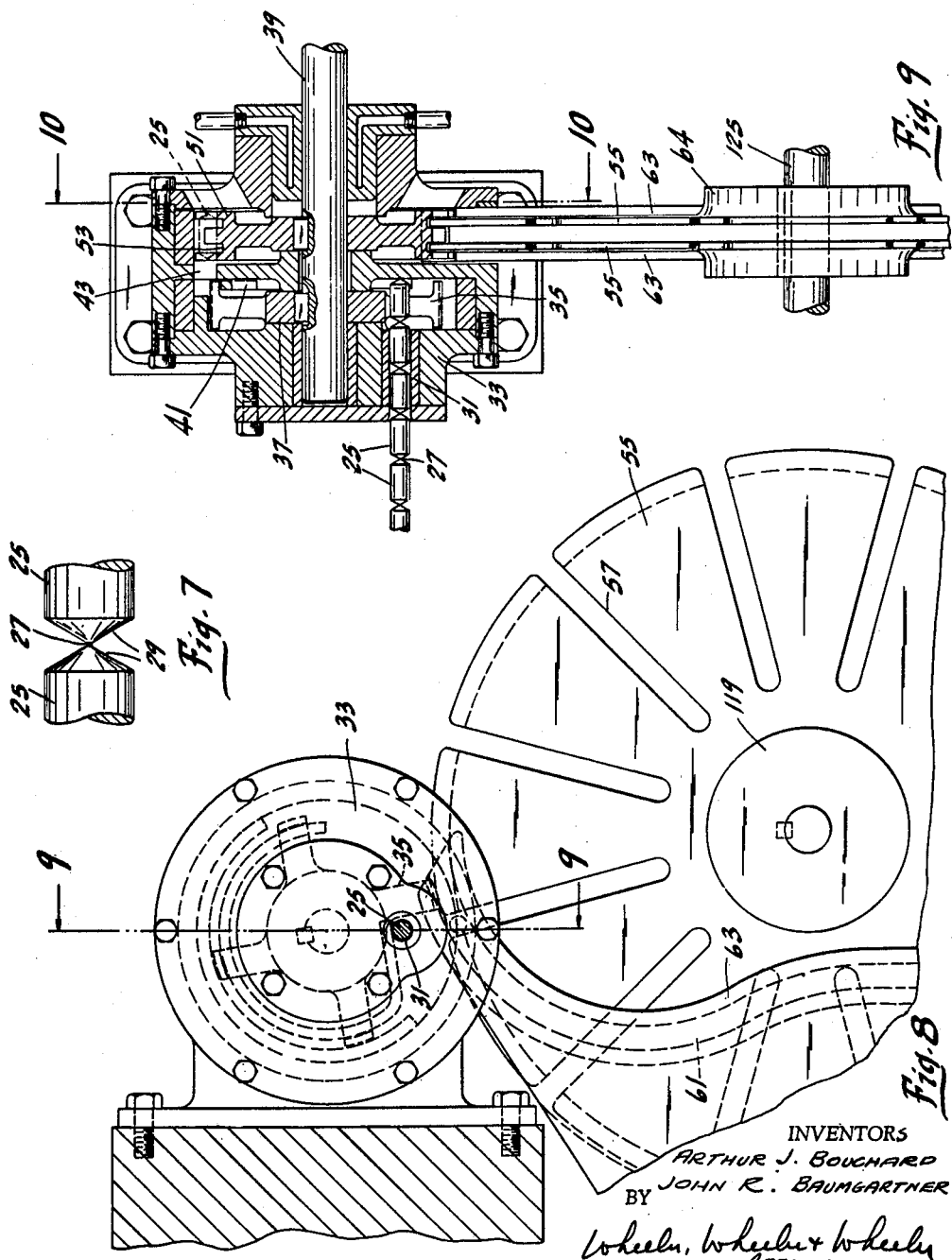

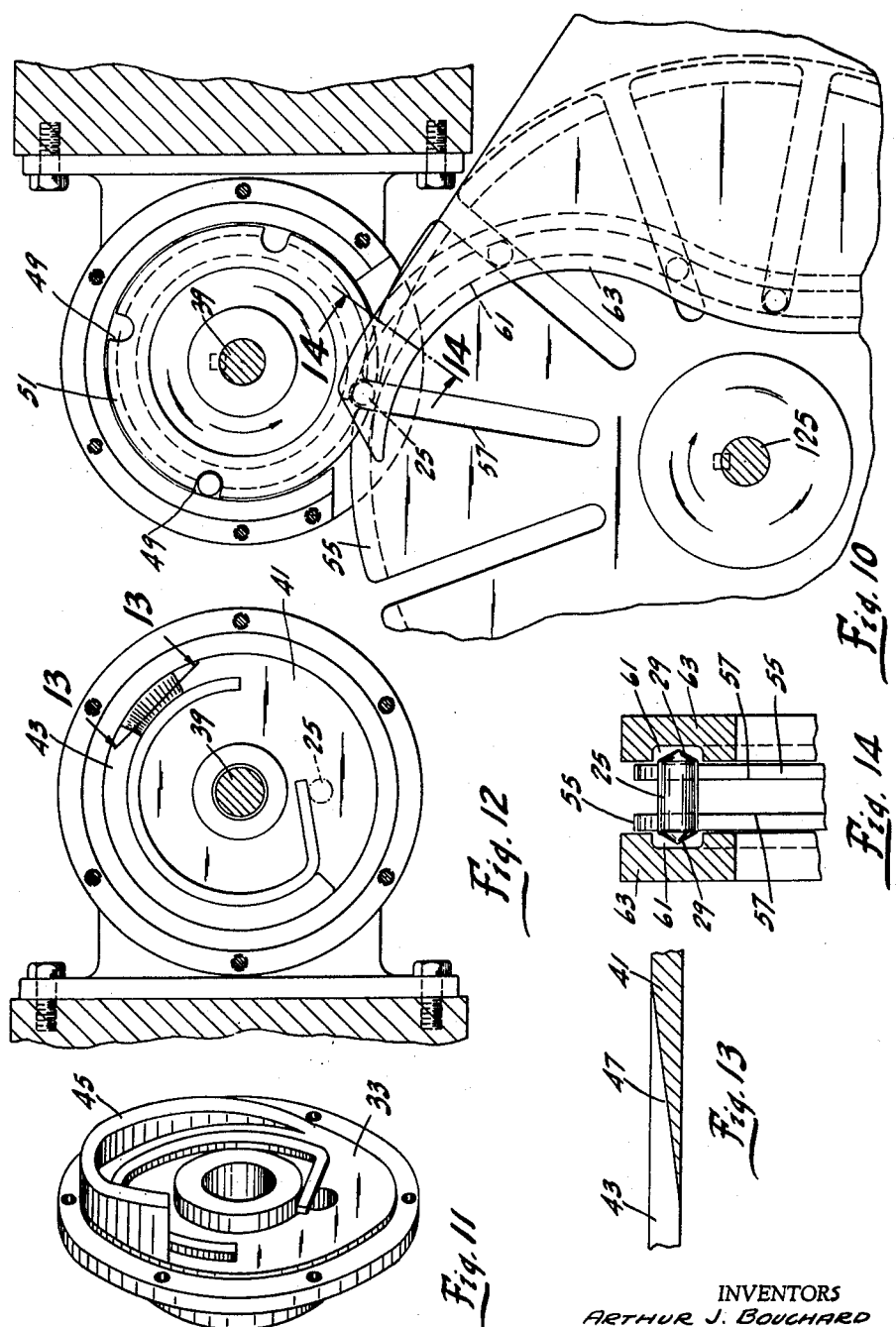

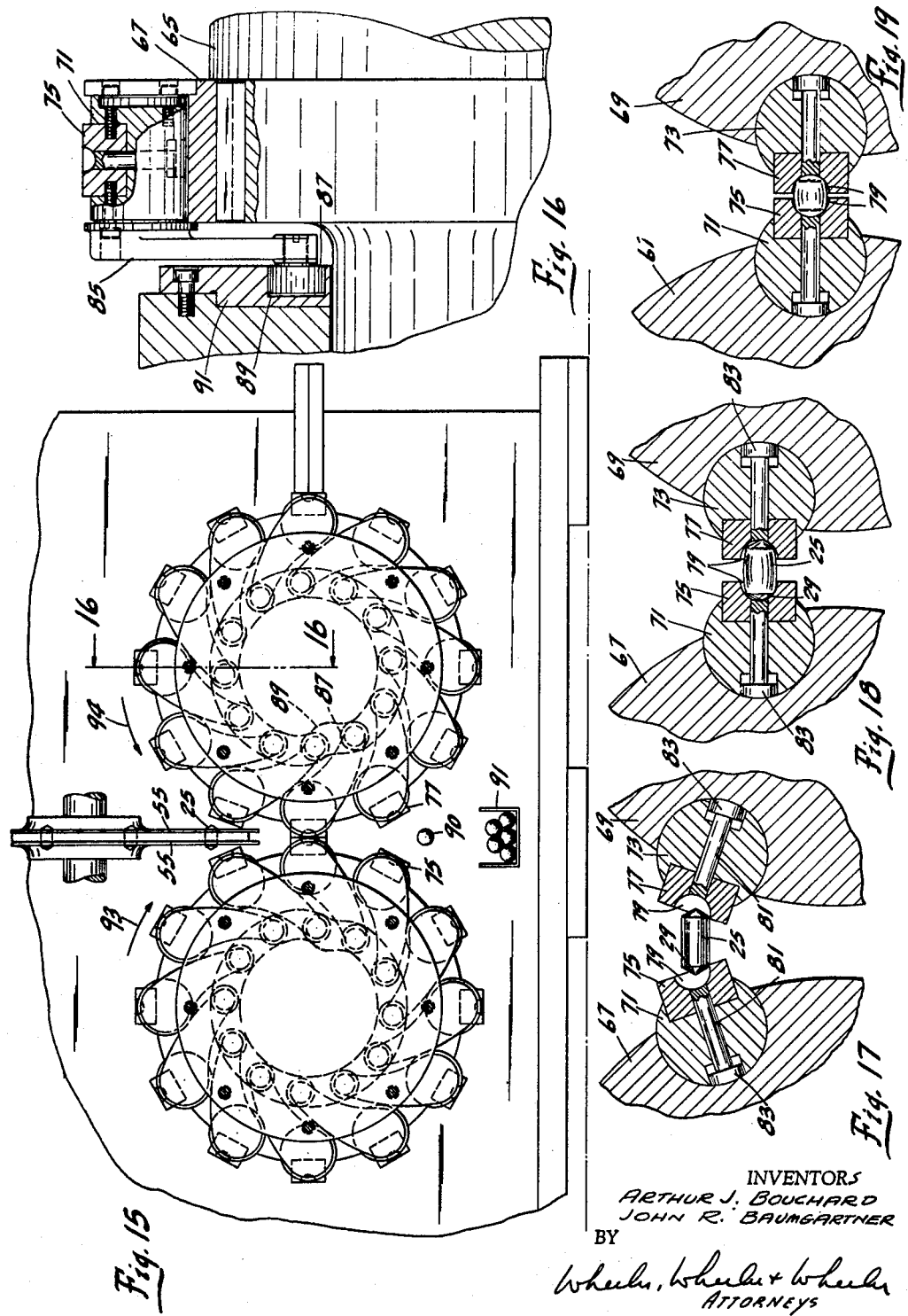

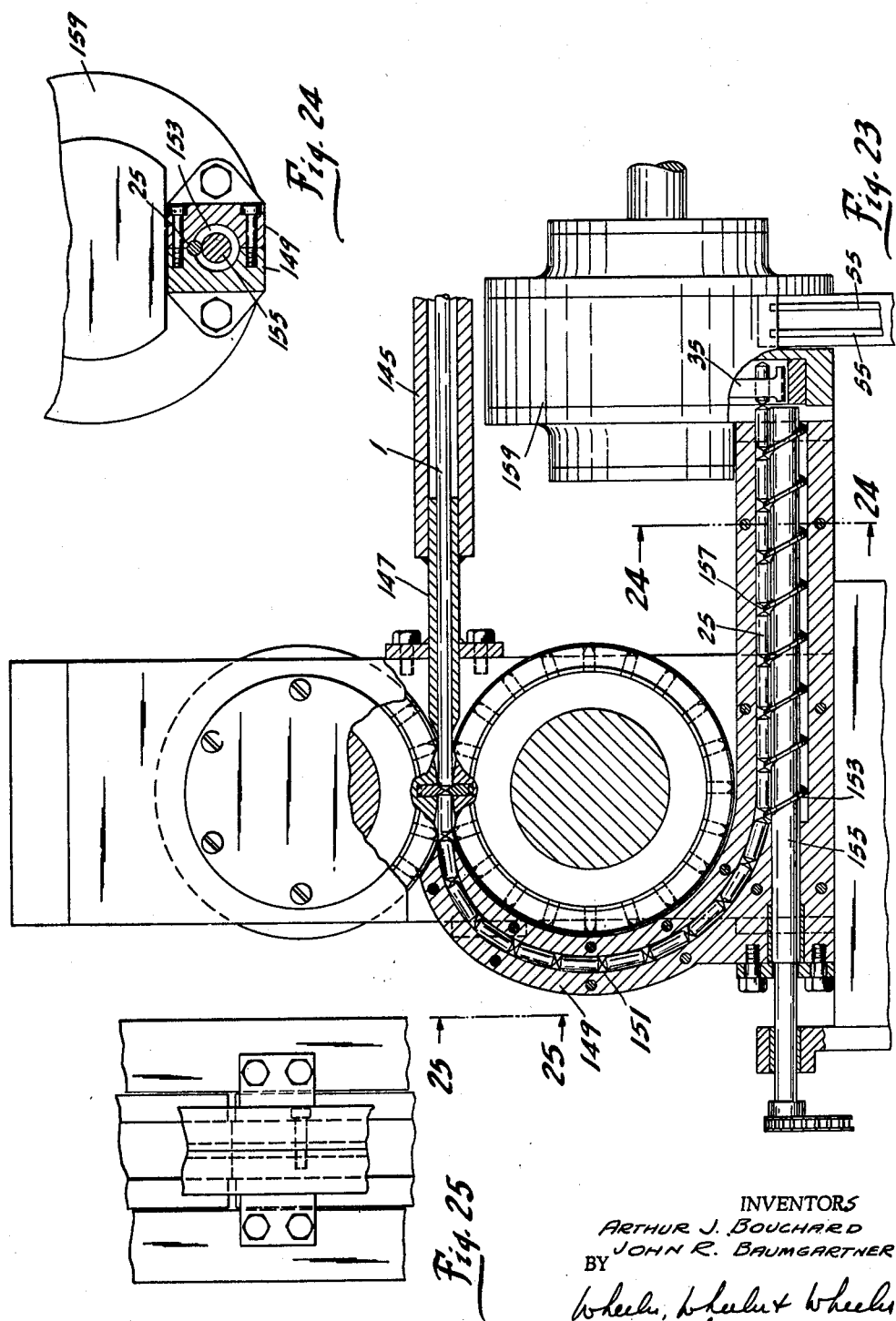

United States Patent Office 3,478,556
Patented Nov. 18, 1969

3,478,556
FORGING APPARATUS
John R. Baumgartner, Fort Lauderdale, Fla., and Arthur
J. Bouchard, Milwaukee, Wis., assignors to Rota Forg
Corporation, a corporation of Illinois
Original application Jan. 15, 1962, Ser. No. 166,031, now
Patent No. 3,239,912. Divided and this application
Oct. 15, 1965, Ser. No. 495,920
Int. Cl. B21d *13/08*
U.S. Cl. 72—185                                   15 Claims

ABSTRACT OF THE DISCLOSURE

For forging balls, slugs are interposed between dies which are mounted on rotors and close in the course of rotor movement, the dies being pivoted to their respective rotors and cam controlled in such manner as to be maintained in alignment as they close, thus controlling grain distribution and minimizing flash. Optionally, the material from which the slugs are severed may be passed helically through a compact heating furnace for delivery in continuous movement into the dies.

---

The present application is a division of our application 166,031, filed Jan. 15, 1962, now Patent 3,239,912.

This invention relates to a forging apparatus. The invention will be described with particular reference to the forging of balls, as there are especial advantages in the use of the invention for this purpose.

Objects of the invention are to provide improved control of the grain of the metal and to expedite the forging operation and reduce cost, thereby producing a superior product at reduced expense.

Bar stock is subdivided into slugs by pinch-off dies which cause surface grain to converge. These slugs are continuously delivered without rehandling into a feeder which advances them singly to the forging dies. These compress the slugs axially and expand them diametrically with symmetrical grain distribution.

Each die is pivotally mounted on its respective carrier and controlled by a cam for cooperation with the complementary die on the other carrier. As the dies approach each other in the rotation of their respective carriers, cams hold them open to receive the slugs. The feeder delivers each slug with its ends pocketed in the respective dies. The dies thereupon oscillate into alignment and are maintained in alignment as they approach each other and move toward the common diameter of the respective carriers. As they reach that diameter, the dies make substantial contact and the forging operation is completed.

Since the dies are in alignment as they approach contact, their movement with respect to the slug is rectilinear and the grain distribution is symmetrical notwithstanding rotative movement of the carriers. The product differs materially from what it might otherwise be. For example, a ball which is molded between dies which are fixed on the peripheries of the carriers will have little or no flash on one side and an excessive flash on the other and there will be corresponding imbalance in the distribution of the grain pattern.

In the drawings:

FIG. 1 is a view in side elevation of a forging apparatus embodying the invention.

FIG. 2 is a view in end elevation of the apparatus shown in FIG. 1, portions being broken away.

FIG. 3 is a view taken in section on the line 3—3 of FIG. 2.

FIG. 4 is an enlarged detail view taken in section on 4—4 of FIG. 1.

FIG. 5 is a detail view taken in section on line 5—5 of FIG. 4.

FIG. 6 is a further enlarged detail view in perspective showing one of the pinch-off dies.

FIG. 7 is a detail view showing portions of consecutive and partially separated slugs resulting from the operation of the pinch-off dies.

FIG. 8 is an enlarged view taken in section on the line 8—8 of FIG. 1.

FIG. 9 is a view taken in section on the line 9—9 of FIG. 8, portions of the feeder being shown in side elevation.

FIG. 10 is a view taken in section on the line 10—10 of FIG. 9.

FIG. 11 is a detail view in perspective of the lefthand cover plate of the camming mechanism shown in FIG. 9.

FIG. 12 is a view in side elevation of the righthand cover plate of the mechanism shown in FIG. 9.

FIG. 13 is a fragmentary detail view on the line 13—13 of FIG. 12.

FIG. 14 is a fragmentary detail view taken in section on the line 14—14 of FIG. 10.

FIG. 15 is a fragmentary detail view in section on the line 15—15 of FIG. 2.

FIG. 16 is a view taken in section on an enlarged scale on the line 16—16 of FIG. 15.

FIG. 17, FIG. 18 and FIG. 19 are enlarged detail views taken in section showing successive relative positions of complementary dies as they oscillate upon their respective carriers in the course of a forging operation.

FIG. 20 is a view in side elevation showing a modified embodiment of the invention.

FIG. 21 is a fragmentary plan view of the apparatus shown in FIG. 20.

FIG. 22 is a view taken in section on the line 22—22 of FIG. 21.

FIG. 23 is an enlarged detail view partially in side elevation and partially in section through the pinch-off and slug delivery mechanism of this embodiment.

FIG. 24 is a view taken in section on line 24—24 of FIG. 23.

FIG. 25 is a fragmentary detail view taken from the viewpoint indicated at 25—25 in FIG. 23.

In the embodiment shown in FIGS. 1 to 19, inclusive, no means is illustrated for heating the work. It will be understood that the rod stock 1 may either be cold or it may have been heated before being fed into pinch-off dies shown in FIGS. 5 and 6. The shafts 3 and 5 carry rotors 7 and 9 upon which complementary pinch-off dies 13 are mounted. A detail of one of the dies appears in FIG. 6. It has flanges at 15 for anchoring it to its rotor and its outer surface 17 is arcuately finished on the radius of the rotor. At its opposite sides are channel-shaped obliquely disposed cuts at 19 and 21 for forming upper margins which nearly meet at 23 in a pinch-off edge.

As like dies on the respective rotors 7 and 9 come together upon the intervening rod stock 1, the rod becomes subdivided into slugs 25 which, in this embodiment, are not completely separated but remain united by a readily frangible neck at 27 (see FIG. 7).

The concave form of the channeled surfaces 19, 21 of the respective pinch-off dies 13 shapes the ends of respective slugs conically at 29. The frain longitudinally of the surface of the bar or rod 1 is formed symmetrically inwardly toward the neck 27 at the apex of conical surface 29.

As the work leaves the pinch-off dies, the partially severed slugs pass through a sleeve 31 in cover plate 33 of a device which breaks off the slugs and delivers them to the feeder. The still-connected slugs are in continuous movement. In the course of their advance, the slug at the end of the series is engaged by the arm 35 of a star wheel 39 (FIG. 9). By the time the end of the leading slug encounters the partition 41, it will be broken free of the ensuing slug and caused to move circumferentially clockwise from the dotted line position shown in FIG. 12. The partition 41 has an open arcuate slot at 43 toward which the slug is urged in the course of its clockwise movement, being subjected to endwise pressure of the fixed cam 45 carried by the cover plate 33. By the time the slug has completed 180° of arcuate movement, it will have passed through the partition 41 and will have been urged by the cam surface 47 into one of the notches 49 of rotor 51 as shown in dotted lines in FIG. 9. This rotor has peripheral grooves at 53 which intersect the notches 49 to receive the margins of the paired disks 55 of the feeder.

Rotor 51 moves counterclockwise as viewed in FIG. 10. It receives one of the slugs 25 directly above the shaft 39. As slugs rotate to positions below shaft 39, they enter successive radial slots 57 of the feeder disks 55 and, substantially concurrently, the ends of the slugs enter guide channels 61 of the stationary feeder arms 63. There are two such arms in the form of plates having mounting flanges 64. The arms are spaced to receive the disks 55 between them. The form of the slots 61 is clearly indicated in FIGS. 2, 8 and 10.

With their ends guided by the slots 61, the slugs are at first caused to move centrally inwardly of the feeder disks 55 and are finally discharged radially of the disks as the disks rotate. In the course of feeding movement, the slugs become securely centered on the feeder disks as shown in FIG. 14. The conically tapered ends 29 of the respective slugs 25 are projecting somewhat beyond the bases of the feeder disks to be received into the channels 61 of guide arms 63 (FIG. 10).

The shafts 65, 66 mount carriers 67, 69 for rock shafts 71, 73 in which the forging dies 75, 77 are fixed as shown in FIGS. 17 to 19. For ball production, the pocket 79 of each of these dies is hemispherical and each may be equipped, if desired, with a work-ejecting plunger 81 reciprocably supported diametrically of the respective rock shafts and provided with a head at 83 within the cylindrical surface of the rock shaft.

As clearly shown in FIGS. 15 and 16, the respective rock shafts have arms 85 provided with cam follower rollers 87 operating in the cam slots 89 of fixed cam elements 91. The general form of the cam slots is shown in FIG. 15. The form is so determined that as the carriers rotate oppositely in the manner indicated by the arrows 93, 94 in FIG. 15, the complementary dies 75, 77 of each set will be held open in the approximately radial positions in which they are illustrated in FIG. 17 until the feeder disks 55 deliver a slug 25 into the respective die sockets 79. The slug is considerably longer than the diameter of the coacting sockets but is initially of considerably smaller radius.

FIG. 18 shows how the interaction of the cam slots 89 and the cam follower rollers 87 oscillates rock shafts 71 and 73 in their respective carriers 67 and 69 to a position in which their sockets 79 are now in axial alignment. This position of the parts is maintained until the forging operation is complete. At the stage shown in FIG. 18, the approach of the forging dies 75 and 77 has already begun to compress the slug 25 axially, its tapered ends 29 having aligned themselves with the axes of sockets 79 and the axial pressure having caused the slug to bulge at its center.

In the position of the parts shown in FIG. 19, the forging dies 75, 77 have not quite reached the point of closest approach, being still above the common diameter of the carriers indicated by the line 85. FIG. 15 shows the dies fully engaged but even in the positions of the dies in FIG. 19 the slug has been compressed to nearly spherical form. It will be observed that the deformation thereof is necessarily entirely symmetrical as the result of the fact that the dies 75, 77 are moved toward each other in rectilinear alignment notwithstanding the fact that their translative movement upon their respective carriers 67, 69 is rotative.

Because of the fact that the dies move rectilinearly and their surfaces are parallel in approaching full engagement, any flash will be symmetrically and substantially uniformly distributed. Moreover, because of such rectilinear movement, it is possible to calculate the amount of metal in the slug sufficiently closely so that there will be a minimum of flash, it being unnecessary to allow for any voids such as sometimes result when rotary forging dies are not thus compensated to approach in rectilinear alignment.

As the dies 75, 77 move beyond the point of full engagement, the successive completed balls 90 are discharged into an appropriate receptacle or delivery trough 91 (FIG. 15).

The forging may be done with the slugs cold, or the metal may have been heated.

While there is nothing special about the driving connections, these will be described briefly.

The power input pulley is shown at 93 in FIG. 2. It is mounted on a drive shaft 95 having a pinion 96 meshing with gear 97 on shaft 99. The gear 101 on shaft 99 meshes with gear 103 upon shaft 66, this being one of the shafts which mounts a forging die carrier 69. It is intergeared with shaft 65 by means of gear 105. Shaft 65 carries the other forging die carrier 67.

The gear 103 not only meshes with gear 105 but also meshes with a gear 107 on shaft 109, the latter having a smaller gear 111 meshing with gear 113 on shaft 5 which carries the lower pinch-off die rotor 9. The upper pinch-off shaft 3 carries gear 115 meshing with gear 113 as shown in FIGS. 3 and 4. It is, of course, important that the pinch-off die shafts be intergeared for accurate operation in unison.

The drive of the various slug feeding devices is taken from gear 105. Meshing with gear 105 is a gear 117 on the shaft 119. From shaft 119 motion is transmitted through the bevel gears 121, 123 to the shaft 125 for feeder means 55 (FIGS. 1 and 2).

Through the intermediate gear 127, meshing with gear 117, motion is transmitted to gear 129 on shaft 131. The bevel gear 133 on shaft 131 meshes with bevel gear 135 on the shaft 39 as shown and described in connection with FIG. 9, this being the mechanism which moves the successive slugs onto the feeder disks 55.

In the embodiment shown in FIGS. 20 to 23, inclusive, there is diagrammatically illustrated a heating furnace 141, the use of which is optional. Heat rolls 143 propel the rod stock 1 into the furnace, where it follows a circuitous path to assure adequate heating. The rod issues through the sleeve 145, which is provided at its end with a guide 107 for delivering the stock to the pinch-off dies. These are similar to the dies described above but preferably completely sever the slugs. The present embodiment contemplates slug delivery through complementary channel-forming means 149 providing a channel 151 through which the formed slugs are delivered arcuately into engagement with the thread 153 of a screw 155 which forces the slugs apart and propels them in slightly spaced relationship along the channel 157 which parallels the screw. This channel leads into a housing 159 where the slugs are picked up by the rotor arms 35 and ultimately delivered to the feeder disk means 55 as in the embodiment previously disclosed.

The metal rod from which the slugs are cut has longitudinal grain which it is desired to distribute as symmetrically as possible from pole to pole of the resulting balls. Accordingly, when the slugs are severed from the rod, this is done by pinching them off rather than cutting them off, the pinching operation being so conducted that as far as possible the surface of the rod is formed inwardly from all sides toward the rod axis. Each resulting slug is a generally cylindrical elongated body tapering at each end toward an apex. The diameter of the body is materially less than the diameter of the ultimate ball but its length is correspondingly greater than the diameter of the ultimate ball.

The slug is centered in cup-shaped open forging dies which are initially at an angle to receive the slug but move into perfect alignment before closing so that the final operation of the method includes axial compression of the elongated slug to reduce its length and correspondingly increase its width or diameter symmetrically so that the convergence of the grain toward the apices is maintained. Thus the surface of the finished product is almost entirely made up of the surface metal of the original bar and the initially longitudinal surface grain of the metal is distributed with as much regularity as possible from pole to pole of the resulting sphere, the poles being defined as the points most remote from the plane at which the dies meet. Since any flash will represent an interruption, to some extent, of the continuity of grain pattern, it is important that any flash produced in the practice of this method be substantially symmetrically distributed and of minimum amount.

It will, of course, be understood that in the preferred practice of the method the operation and the movement of the work are continuous to the discharge of the completed product. Ordinarily this product may be a ball but the dies may be shaped to produce non-spherical products, if desired.

We claim:

1. In a device of the character described, the combination of a pair of die carriers mounted for rotation, pairs of dies respectively mounted on respective carriers for rotative movement to and from cooperative closing in the course of carrier rotation, means for the synchronous rotation of the carriers, supports for the dies upon the respective carriers and upon which the dies are pivotally movable, and means for controlling the relative pivotal positions of the dies of each pair as the dies approach closing position in the course of carrier rotation.

2. In a device of the character described, the combination of a pair of carriers, pairs of dies having means respectively pivotally mounting them in annular series of complementary dies upon the respective carriers, means supporting the carriers for rotation in positions such that the complementary dies move angularly and substantially close upon each other in the course of carrier rotation, means for the timed rotation of the carriers, and means for respectively pivoting the dies of each pair of complementary dies with respect to the carriers upon which they are pivotally mounted with respect to the radii of their respective carriers in a direction and at a rate to cause the complementary dies to approach each other rectilinearly notwithstanding their angular movement upon their respective carriers.

3. A device according to claim 2 in which said last mentioned means comprises a rock shaft upon which each such die is pivoted and for which the respective carrier has bearing means, and a rocker arm connected with the rock shaft and provided with a cam follower, and a cam with which the cam follower coacts and which has a form to maintain the complementary die in alignment as they approach each other.

4. In a ball forging machine, the combination of a pair of rotatable carriers, pairs of complementary dies, each die having means mounting it for pivotal movement upon its respective carrier, means mounting the respective carriers for rotation in positions in which the pairs of complementary dies of the respective carriers approach mutual engagement as the carriers rotate, means for rotating the respective carriers to effect movement of said complementary dies toward engagement, means for delivering a workpiece between the complementary dies as they approach such engagement, and means operative in the movement of said dies toward such engagement for maintaining the dies in alignment with each other during their rotative movement with their respective carriers toward such engagement, whereby the workpiece is subjected to substantially rectilinear pressure in the movement of the dies toward such engagement, notwithstanding such rotative movement.

5. In a machine for forging slugs into balls, the combination of a pair of rotatable carriers, complementary pairs of dies, a pivotal support for each die mounted on the respective carrier, the said supports and dies being in complementary annular series on the respective carriers, means operatively supporting the respective carriers for rotation in position such as to move complementary dies toward mutual engagement as the carriers rotate, means for driving the carriers, means for introducing slugs between complementary dies as they approach such engagement, and means for holding in alignment the complementary dies between which a slug has been introduced as such dies act on the introduced slug in approaching such engagement.

6. In a machine for forging slugs into balls, the combination with a pair of rotatable die carriers, of two annular series of relatively complementary dies mounted on the respective carriers, means supporting the carriers for rotation in positions in which the complementary dies of the respective carriers move toward mutual engagement as the carriers rotate, means pivotally mounting respective dies upon the respective carriers, cam and cam follower means controlling the angular positions of the respective dies upon their pivotal mounting means as they move toward mutual engagement in the course of carrier rotation, said cam and cam follower means being adapted to hold the dies in substantial alignment as they approach engagement, means for cutting elongated slugs of bar stock of a volume sufficient to fill the complementary dies of each successive pair, and means for positioning a slug between the dies of each pair as such dies move toward positions of engagement, the slugs being subject to longitudinal pressure rectilinearly of the aligned position of the complementary dies in the course of such approach.

7. A machine according to claim 6 in which the means for feeding such slugs comprises rotatable disk means disposed at an angle intermediate the respective carriers and having terminal notches in which successive slugs are engaged.

8. A machine according to claim 6 in the means for feeding such slugs comprises rotatable disk means disposed at an angle intermediate the respective carriers and having terminal notches in which successive slugs are engaged, and arms spaced to receive the disk means and having channels in which the ends of the respective slugs in said notches are guided in approaching the complementary dies.

9. A ball forging machine comprising means for feeding bar stock, means for pinching off successive slugs by compressing surface portions of said bar stock toward the axis thereof, slug feeding means including means for guiding the ends of respective slugs, complementary dies in annnular series, carriers supporting such dies for rotative movement to bring the complementary dies toward mutual engagement, means rotatably supporting the carriers in positions in which the path of die movement intersects the path of slug movement on which the slugs are advanced by the feeder, whereby successive slugs are delivered into successive pairs of dies, means for rotating the carriers in directions to advance successive complementary dies toward mutual engagement upon the contained slug delivered thereto by said feeder, means pivotally supporting respective dies upon respective carriers, and cam follower means for maintaining complementary dies in substantial alignment for rectilinear compression of a contained slug in the course of movement toward mutual engagement.

10. A ball forging machine according to claim 9 in which the feeder comprises outwardly slotted disk means and arms spaced at opposite sides of the disk means and having guide channels for the ends of the slugs, and means for loading successive slugs into the slots of the feeder and the channels of said arms.

11. In a ball forging machine the combination with a rod feeder, of a pair of rotors provided with complementary peripheral pinch-off dies each comprising a margin, and means providing a channel obliquely approaching said margin, and in further combination with means for advancing and completing the severance of slugs defined by the action of the pinch-off dies on the rod stock, and means for loading the severed slugs into a feeder, means for actuating the feeder for delivery of such slugs and rotatable pairs of forging dies into which the feeder delivers the slugs, and means for rotating the forging dies toward mutual engagement to forge the slugs.

12. A machine according to claim 11 in which each forging die is provided with a pivotal mounting, and a cam and cam follower means for maintaining it in alignment with a complementary forging die as the forging dies compress the slug.

13. A forging machine comprising means for the continuous advance of bar stock, means for the heating of such stock in the course of its advance, means for severing slugs from the stock in the course of its advance, continuously operable forging dies, carriers upon which the dies are movable to and from operative engagement in pairs, and means for feeding severed slugs between the dies of successive pairs during the movement thereof.

14. A forging machine according to claim 13 in which the dies are pivotally mounted on the carriers, and the carriers are rotatably mounted, and cam means adjusts the angular positions of the dies on the respective carriers to maintain the dies in alignment as they close upon the slugs fed between them.

15. In a machine for forging elongated slugs by compressing the slugs in a lengthwise direction, the combination with a pair of rotatable die carriers, means mounting said carriers for rotation in positions in which their respective peripheries are proximate to each other, annular series of complementary dies mounted on the respective carriers for movement into engagement as the carriers rotate, means pivotally mounting the respective dies of said series upon respective carriers, means for moving the respective dies with reference to their respective carriers and for holding the dies in substantial alignment as they approach engagement, said last means including cam and cam follower means controlling the angular positons of the respective dies upon their pivotal mounting means as they move toward mutual engagement in the course of carrier rotation, means for positioning between the dies of respective carriers as they approach engagement slugs which are elongated and have a volume sufficient to fill the complementary dies so that said slug is compressed longitudinally as the dies approach positions of engagement, said slugs being subject to longitudinal pressure rectilinearly of the aligned position of the complementary dies in the course of such approach.

References Cited

UNITED STATES PATENTS

| | | | |
|---|---|---|---|
| 2,587,742 | 3/1952 | Lorig | 266—3 |
| 3,171,876 | 3/1965 | Nye et al. | 266—3 |
| 3,328,988 | 7/1967 | Schmidt | 72—364 |
| 308,452 | 11/1884 | Wright | 72—198 |
| 801,267 | 10/1905 | Reid | 72—71 |
| 1,525,222 | 2/1925 | Canda | 72—71 |
| 2,700,909 | 2/1955 | Gronemeyer | 72—71 |

CHARLES W. LANHAM, Primary Examiner

L. A. LARSON, Assistant Examiner

U.S. Cl. X.R.

72—198